United States Patent
Parker

(10) Patent No.: US 6,912,464 B1
(45) Date of Patent: Jun. 28, 2005

(54) INERTIAL NAVIGATION ACCURACY ENHANCEMENT

(75) Inventor: David R. Parker, Lancashire (GB)

(73) Assignee: BAE Systems plc, Farnborough (GB)

( * ) Notice: Subject to any disclaimer, the term of this patent is extended or adjusted under 35 U.S.C. 154(b) by 1604 days.

(21) Appl. No.: 09/116,810

(22) Filed: Jul. 14, 1998

(30) Foreign Application Priority Data

Jul. 14, 1997 (GB) .............................................. 9714720

(51) Int. Cl.$^7$ ............................................ G01C 21/26
(52) U.S. Cl. ..................................................... 701/221
(58) Field of Search .................................. 701/213, 221

(56) References Cited

U.S. PATENT DOCUMENTS 4,495,580 A * 1/1985 Keearns ...................... 701/217
4,792,904 A 12/1988 Reinagel et al.

FOREIGN PATENT DOCUMENTS

| EP | 0 436 213 | 7/1991 |
| GB | 2 041 689 | 9/1980 |
| GB | 2 289 389 | 11/1995 |

OTHER PUBLICATIONS

Sim, D.-G. et al. "Navigation Parameter Estimation from Sequential Aerial Images", International Conference on Image Processing, 1996. Proceedings. Sep. 1996, pp. 629–632.*

* cited by examiner

*Primary Examiner*—Gregory C. Issing
(74) *Attorney, Agent, or Firm*—Nixon & Vanderhye P.C.

(57) ABSTRACT

Apparatus for the improvement of inertial navigation system (INS) position/velocity comprises frame stores for storing sequential images from a video camera and a comparator for comparing pixels in predicted images, derived from earlier stored images as modified by INS linear and angular velocity outputs, with pixels in actual later stored images, to derive a velocity error correction signal which is used to correct the INS output. The video processing correction system described is passive and hence does not reveal the aircraft's whereabouts as would be the case with other positional correction systems using radar, nor does it rely on systems outside the control of the INS, e.g., GPS, nor is it reliant on a vast terrain feature database.

6 Claims, 2 Drawing Sheets

INERTIAL NAVIGATION ACCURACY ENHANCEMENT

FIELD OF THE INVENTION

This invention relates to inertial navigation systems (INS) and in particular to airborne INS systems deriving positional data at least in part from velocity estimates.

BACKGROUND OF THE INVENTION

In the past, Doppler radars have been used to measure aircraft velocity relative to the ground plane in order to bound the errors in the INS, however, the Radio Frequency, RF, emissions inherent to this technique increase the vulnerability of the aircraft to hostile threats. The errors in the INS solution may be calibrated and removed by the use of the navigation solution provided by a Global Position System (GPS) receiver. However, GPS accuracy can be degraded at the whim of the US Government and hence, this option for achieving a high accuracy navigation solution may not always be available. Finally, research and development effort is currently directed at systems that will compare sensory imagery of the outside world with prior knowledge of its state, in order to maintain an accurate estimate of the aircraft's position. Encouraging results from this work have been presented, but, to be viable operationally, large quantities of data will have to be gathered and processed at great expense, in order to generate the data map of the entire world with which the sensor imagery will have to be compared.

The present invention seeks to provide an INS positional accuracy enhancing system which is more covert than a Doppler radar, works independently of manmade external references and does not require the creation of large, expensive databases with which to compare sensor imagery.

The present invention also seeks to provide such a system which will work in areas of the world where the ground is flat and featureless, such as over oceans and deserts, where other self-contained systems, for instance, Terrain Reference Navigation are unable to operate.

SUMMARY OF THE INVENTION

According to the present invention an inertial navigation system positional accuracy enhancement system (INS accuracy enhancement system) comprises imaging sensor means for imaging the terrain over which the aircraft is flown, at least two image storage means for temporarily storing successive images of the said terrain, switching means for connecting the at least two image storage means in a repeating sequence to the imaging sensor means overwriting any previously stored images therein, predicted image generating means adapted for connection to angular and linear velocity outputs of an INS for sequentially accessing and modifying images stored by the at least two image storage means in accordance with data provided by said angular and linear velocity outputs to produce a sequence of predicted images, and, comparator means for comparing each of said predicted images with images stored by the at least two image storage means after the production of said predicted images and for producing a velocity correction signal therefrom for application to a position correction input of said INS.

The comparator means may operate according to a program using a Hough Transform to compare pixel flow estimates made in the image plane with a series of pixel flow predictions generated by combining knowledge of the imaging sensor means position relative to the ground plane with estimates of velocity provided by the INS.

The imaging sensor means may be a video camera and the image storage means may then be video frame stores.

The problem of estimating camera motion from an image sequence has been addressed by numerous researchers, (Murray, Sinclair, Blake. IJCV, 13(1); 57–69, 1994), (B. K. P. Horn, Shahriar Negahdaripour. IEEE PAMI, 9(1): 168–176, 1987) and (H. C. Longuet-Higgins. Nature, 293: 133–135, 1981). A prime motivator for this work has been the navigation of camera equipped mobile robots, (Bir Bhanu, William Burger. IEEE PAMI 12(11) 1990).

The general approach is to measure the image motion, between frames in a sequence at a minimum of 8 points, and to solve a system of simultaneous equations for the absolute rotation and the translation, up to a scale factor, of the camera from one frame to the other. More than 8 point displacement measurements are often made, to reduce the effect of noise, (J. W. Roach, J. K. Aggarwal. IEEE PAMI, 2(6): 554–562, 1980).

Two classes of techniques are widely used for estimating image motion:

1. Detection of unique corresponding features in each image to form a sparse set of image motion vectors.
2. Estimation of the spatial and temporal gradients in the image function I(x,y,t) and use of the optical flow constraint, (Berthold K. P. Horn, Brian G. Schunk. Artificial Intelligence, 17 185–203, 1981):

$$\frac{\partial I}{\partial x} \times v_x + \frac{\partial I}{\partial y} \times v_y = -\frac{\partial I}{\partial t} \tag{1}$$

together with a model for the optical flow field to produce a dense set of image motion estimates. This method is unsuitable for estimating large image motions because the spatial gradients must remain correlated for the temporal gradients to be estimated correctly, (Joseph K. Kearney, William B. Thompson, Daniel L. Boley. IEEE PAMI, 9(2): 229–244, 1987).

Thus, in general, feature correspondence is the only suitable technique for estimating motion in the image sequence from a rapidly translating camera. However, the process is expensive and the resulting estimates are noisy with large numbers of outliers due to electronic noise and mis-correlation of image features, (W. A. Powell. PhD Thesis, School of Engineering, University of Manchester, March 1997). Thus, robust estimators for camera motion, such as iterative robust least squares, (Chung Nan Lee, Robert M. Haralick, Xinhua Zhuang. In Proceedings of IEEE Workshop on Visual Motion 1989) or, Hough Transform style approaches, (G. A. Kimball, Dana H. Ballard. CVGIP, 22: 95–115, 1983) are preferred over simple least squares methods. These solutions are computationally expensive and so real time implementation is difficult.

Our proposed approach is to use existing camera motion estimates to warp images into approximate registration and to attempt to refine the original camera motion estimate. Thus, an advantage is gained by reducing a long range motion estimation problem to a short range one, allowing an inexpensive optical flow algorithm to be used in place of an expensive correspondence algorithm.

BRIEF DESCRIPTION OF THE DRAWINGS

An embodiment of the invention will now be described with reference to the accompanying drawings of which.

FULL DESCRIPTION OF THE DRAWINGS

Figure 1:
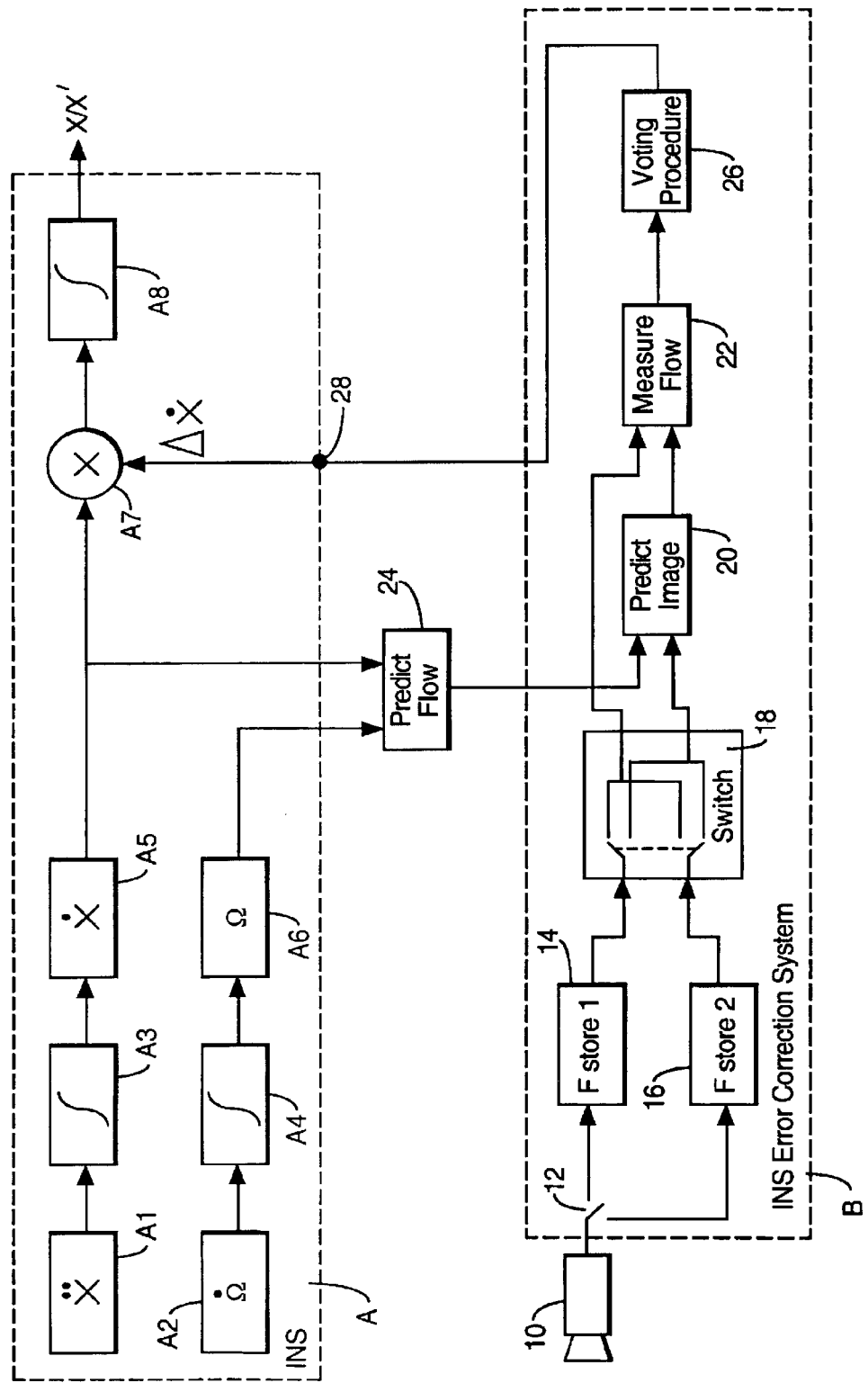
FIG. 1 is a block schematic diagram showing part of an INS and an INS correction system according to our invention.

In FIG. 1, an inertial navigation system (INS) shown generally at A includes standard linear and angular acceleration detectors A1 and A2, respectively. The output of the linear accelerometer A1 is integrated, A3, to produce a velocity signal, A5, which may then be integrated again, A8, to produce a position signal X.

The output of the angular acceleration unit A2 is integrated, A4, to produce an angular velocity A6.

The INS would conventionally use the various values of angular and linear acceleration, angular and linear velocity and position to provide information to the pilot of an aircraft or to control the aircraft.

It is well known that INS will require regular verification of the accuracy of the information it produces regarding current position due to drifts in its gyroscopes and other effects. When errors are detected, the position values are corrected and the system proceeds to work as before until a further verification signal is received.

Verification signals for INS can be derived from radar, GPS or a comprehensive terrain digital database. These correction methods are, for the reasons we described above, not acceptable. Accordingly, as shown in FIG. 1, we have provided a video based INS error correction system indicated generally at B.

The INS error correction system B is connected to receive video data from a Sony DX-151P camera 10. The video signals are switched at the camera frame rate by a switch 12 (we used a Datacube MaxMux) alternately to two frame stores 14 and 16 (we used Datacube ROI stores). The outputs of the frame stores 14 and 16 are connected via a ganged switch 18 to either an input of an image prediction processor 20 or to an input of a picture element flow measurement circuit 22 (the processor 20 and the circuit 22 we used were DEC Alphas).

Linear and angular velocity signals from units A5 and A6 of the INS A (we have used a Honeywell H423 INS) are fed to a picture element flow prediction processor 24 (again, we used a DEC Alpha processor) the output of which is fed to a further input of the image prediction processor 20.

In operation as the aircraft on which the INS A the INS error correction system B and the camera on which they are mounted flies above the Earth's surface with the camera 10 arranged to view it, frame store 14 will store picture elements (pixels) corresponding to an image of the surface at a time $t_0$ and frame store 16 will, by virtue of the operation of the switch 12, store pixels of an image of the surface viewed at time $t_1$. The image stored by frame store 16 is a delayed version of the image stored by frame store 14 during which the aircraft would have moved forward and features of the surface will be depicted on a different set of pixels. The extent to which features have moved between the corresponding pixel elements in the image stored in frame store 14 and the image stored in frame store 16 depends on the aircraft's linear and angular velocities, which are constantly being measured by INS A.

The pixel flow prediction processor 24 produces a signal representative of the predicted movement of the pixels between the first image recorded by frame store 14 and the second image recorded by frame store 16. This signal is used to modify the earlier image by the predicted amount in the image prediction processor 20. At the same time, the actual later recorded image is fed to the pixel flow measurement processor 22 which compares the predicted later image, as calculated from INS information, with the actual later image stored in frame store 16.

In theory, a pixel by pixel comparison may be performed by the pixel measurement processor 22 but in practice it is sufficient to select a small number of pixels from the total images (both stored and predicted) for comparison purposes.

The result of the comparison between the predicted and actual later images is fed via a voting circuit 26 which determines the INS velocity error corresponding to the discrepancy between the two images, to an error input 28 of the INS A.

The error signal produced by the error correction system B, $\Delta \dot{x}$, is used to adjust the linear velocity output of the INS from A5 in an adjustment circuit A7. Thus, the integration performed by integrator A8 on the linear velocity signal will produce an error corrected positional signal $X^1$.

Figure 2:
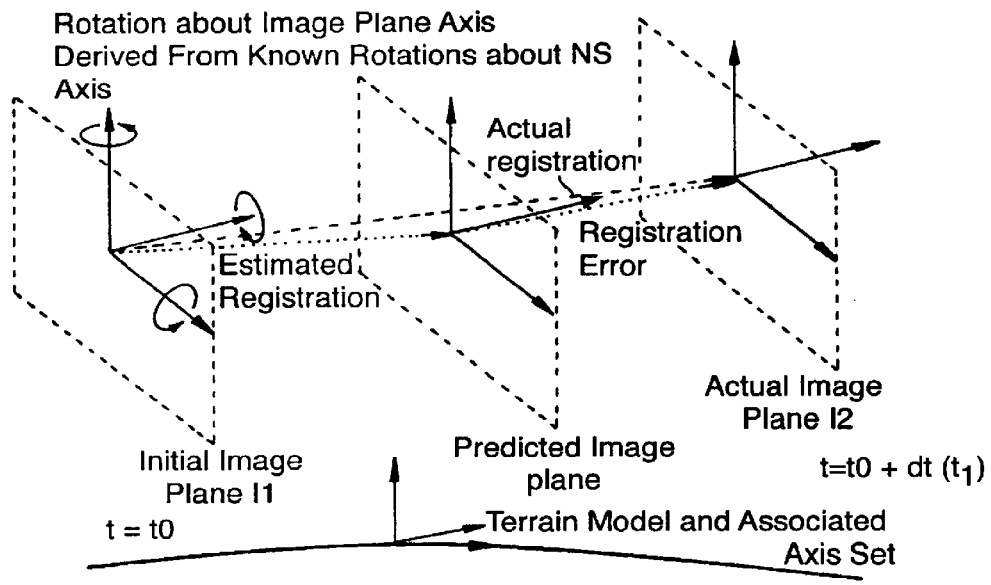
FIG. 2 is a schematic diagram illustrating basic geometrical relationships associated with our invention.

The relationship between the time separated captured images, the predicted image and the final corrected image, used to adjust the INS accuracy is illustrated geometrically in FIG. 2. The operation of the INS error correction system B will now be described again in theoretical terms with reference to FIGS. 2 and 3. The camera 10 of FIG. 1 is in motion relative to a known scene, at a known height h and orientation θ. Given θ, h an uncertain velocity estimate $V_{in}$ and a knowledge of the image formation process, it is possible to predict the frame to frame image motion as recorded by the frame stores 14 and 16 of FIG. 1 and so warp an image into approximate registration with the next. The normal flow between these two images is then a function of $\partial V$, the error in $V_{in}$. Hence, the image motion estimation problem has been simplified from a long range to a short range one because the actual image to image displacements are small enough to allow the use of a standard optical flow algorithm. For an image function I(x, y, t), the normal flow at pixel (x,y) is estimated from the partial derivatives of I using equation 2.

$$v_n = -\frac{\partial I / \partial t}{\sqrt{(\partial I / \partial y)^2 + (\partial I / \partial x)^2}} \quad (2)$$

Figure 3:
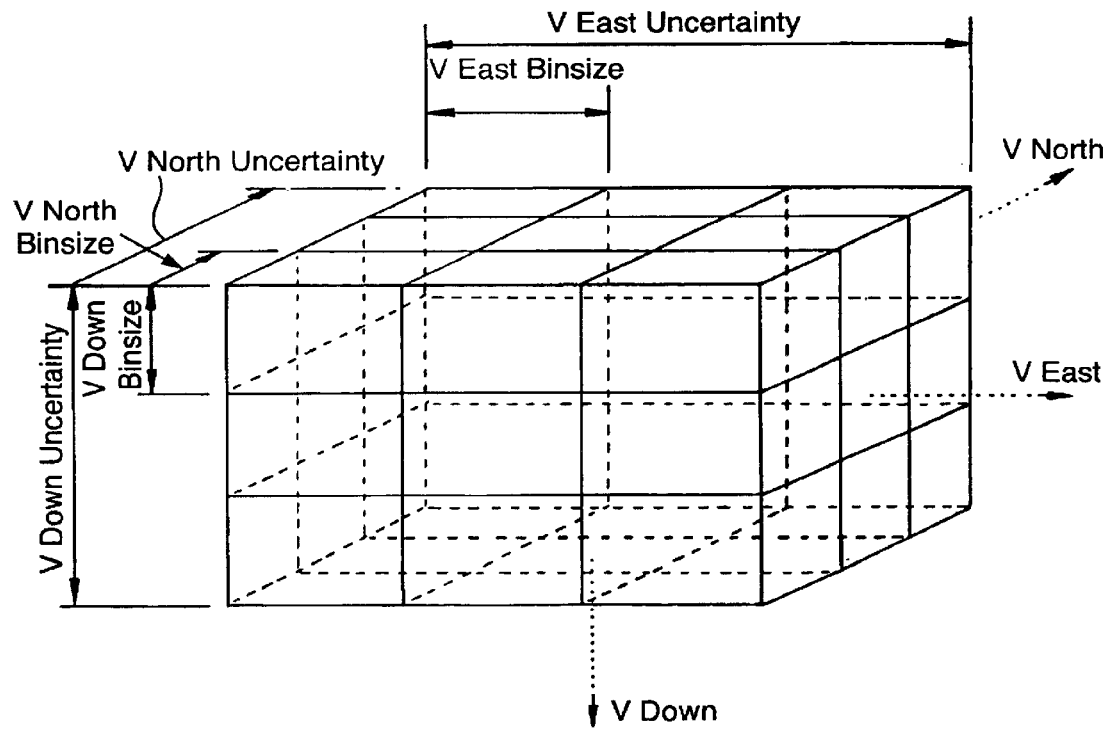
FIG. 3 illustrates a model of INS velocity uncertainty space.

The dominant noise in $v_n$ is outliers due to mis-correlation of the gradients in each image. Hence, a Hough Transform type procedure, described below is used as a robust estimator of $\partial V$. The uncertainty in $V_{in}$ derived from specification data, is used to define the dimensions of the Hough accumulator. This is sub-divided into bins, each one corresponding to a hypothesized value of $\partial V$. FIG. 3 illustrates this arrangement for a 3-dimensional velocity uncertainty.

The normal flow field, $v_{np}$, for each $\partial V_{hypothesized}$ is predicted from the measured image gradient orientations and the predicted full flow field for $\partial V_{hypothesized}$. For every bin, the similarity between the measured and predicted normal flow vectors, at each pixel, is tested with equation 3, in which common dependencies on image position, gradient orientation, camera height and pose are omitted for clarity. If this expression is satisfied, the corresponding bin vote is incremented.

$$|v_n(\partial \underline{V}) - v_{np}(\partial \underline{V}_{hypothesized})| \le v_{tol}(\underline{V}_{binsize}) \quad (3)$$

The tolerance $v_{tol}$ is a function of the image position of the measurement and the accumulator bin dimensions because of the perspective imaging geometry and because the accumulator bins are discrete samples of a continuous function.

If the peak accumulator vote exceeds the acceptance threshold described in the following section, the corresponding $\partial V_{hypothesized}$ is chosen as the correct to $V_{in}$. This process can be repeated for pairs of images throughout the sequence to create a series of estimates for $\partial V$.

The algorithm's principal failure mode is anticipated to be failure of the viewpoint correction process due to noise or biases in the supplied pose or height information. To guard against spurious solutions being accepted in this situation, an acceptance test, based on the probability of the peak vote being due to uncorrelated image inputs, is used. The test assumes that normal flow estimates between uncorrelated images will produce votes in the accumulator that follow a Poisson distribution. Thus, the mean and variance of the vote are the same, provided the number of votes exceeds 5. So, given an estimate of the mean accumulator vote for the bin size in use, the $2\delta$ confidence threshold: exceeded only 2.5% of the time by spurious accumulator peaks can be determined. If only those peaks in the accumulator exceeding this threshold are accepted, the algorithm failure rate should be less than 2.5%.

The mean accumulator vote in this failure mode is predicted by synthesizing the distribution of $v_n$ under failure conditions, as described in the following paragraph and injecting this distribution into the Hough voting procedure.

Consider a normal flow measurement made between two uncorrelated images $I(x, y, t_1)$ and $I(x, y, t_2)$ using the estimator in equation 2, Model $I(x, y, t_1)$ and $I(x, y, t_2)$ as independent Gaussian random variables mean $\mu$ and variance $\delta^2$. The temporal derivative is a simple difference of the two images and the spatial derivatives are estimated with a Sobel operator. By applying standard results for the distributions generated by summing and differencing Gaussian random variables, the distribution of the spatial and temporal derivatives can be produced as Gaussian with $\mu=0$ and $\delta x^2 = \delta y^2 = 3/16 \delta^2$ for the spatial derivatives and $\delta T^2 = 2\delta^2$ for the temporal derivative.

Therefore, the normal flow between two temporally uncorrelated images can be modelled as:

$$\gamma = \frac{T}{\sqrt{X^2 + Y^2}} \quad (4)$$

where X, Y, and T are Gaussian random variables with standard deviations of $0.43\delta$, $0.43\delta$ and $1.4\delta$ respectively. The value of $\delta$ used varies between sequences and is equal to the grey level standard deviation for typical images from the sequence in use.

Hence, the distribution of $\gamma$ can be generated and injected into the Hough voting procedure to give an estimate of the mean noise vote in the accumulator for uncorrelated input data.

Experiments

Video sequences from SONY DX-151P camera 10 in FIG. 1 and navigation data from a Honeywell H423 Inertial Navigation Systems (INS) A in FIG. 1 mounted on a Jetstream 200 avionics trials aircraft were used to investigate the performance of the algorithm. The data used in these experiments was gathered during the following two maneuvers:

1. Sequence 1: A dive over an airfield on a heading of 250°.

2. Sequence 2: An over-flight of the same airfield at an altitude of approximately 300 meters on a heading of 30°.

Because of the difficulty in obtaining high accuracy ground truth for the aircraft velocity and the unavailability of precise altitude estimates, the algorithm was judged on its ability to recover velocity errors injected into the navigation data, rather than on its absolute accuracy. Two different sets of experiments were conducted:

1. Inject a velocity error into the raw INS velocity data and investigate the ability of the algorithm to recover the error at two different resolutions for one image sequence.

2. Inject a velocity error into the raw INS velocity data and for a fixed resolution investigate the algorithm's ability to recover the error for different image sequences.

Experiment 1. Table 1 shows the success rates achieved for the recovery of injected velocity errors at resolutions of 2.2 ms$^{-1}$ and 1.5 ms$^{-1}$, in the horizontal plane, for 35 frame pairs from sequence 1 with $0\delta$ and $1\delta$ confidence thresholds applied. The predicted mean noise vote used as a basis for the acceptance test is also given.

TABLE 1

Experiment 1: Algorithm Success Rate

| Axis and Resolution | Acceptance Test 0 | Acceptance Test 1.0 | Mean Noise Vote |
|---|---|---|---|
| $V_{north}$ 2.2 ms$^{-1}$ | 71% | 100% | 592 |
| $V_{east}$ 2.2 ms$^{-1}$ | 17% | 40% | |
| $V_{down}$ 2.2 ms$^{-1}$ | 74% | 80% | |
| $V_{north}$ 1.5 ms$^{-1}$ | 42% | 100% | 400 |
| $V_{east}$ 1.5 ms$^{-1}$ | 8% | 17% | |
| $V_{down}$ 1.5 ms$^{-1}$ | 80% | 67% | |

These results show good performance in the $V_{north}$ and $V_{down}$ axes, with good agreement at each resolution and the success rate equalling or bettering that expected from the use of the confidence threshold test. The $V_{east}$ performance is not as good: it fails to achieve the expected success rate.

A degradation in performance in all axes is anticipated: the ratio of signal to noise votes in each bin decreases as the bin size is reduced, so allowing the accumulator peak position to be corrupted. However, the poor $V_{east}$ performance is believed to be due to the dominant structure in the scene being oriented east west and so providing poor constraints on $V_{east}$: a failure mode not considered in deriving the acceptance threshold test.

Finally, only one peak exceeded the $2\delta$ confidence threshold test in this experiment.

Experiment 2. This experiment was conducted with both test sequences at accumulator resolutions of 2.2 ms$^{-1}$ by 2.2 ms$^{-1}$ by 1.0 ms$^{-1}$ and the injected errors shown in Table 2. A heuristic acceptance threshold, derived by inspecting the peak accumulator votes for each sequence, was also applied.

TABLE 2

Experiment 2: Injected Velocity Errors

| Sequence | $V_{North}$ Added ms$^{-1}$ | $V_{East}$ Added ms$^{-1}$ | $V_{Down}$ Added ms$^{-1}$ |
|---|---|---|---|
| 1 | −3.6 | −4.3 | 0.0 |
| 2 | −4.6 | 4.6 | 0.0 |

The results of this experiment are shown in Table 3.

TABLE 3

Experiment 2: Algorithm Success Rates

| | $V_{North}$ | $V_{East}$ | $V_{Down}$ |
|---|---|---|---|
| Sequence 1 | | | |
| No Acceptance Test | 56% | 13% | 57% |
| 1 Acceptance Test | 92% | 25% | 58% |
| 2 Acceptance Test | — | — | — |
| Heuristic Acceptance Test | 100% | 100% | 100% |
| Mean Noise Vote | | 592 | |
| Sequence 2 | | | |
| No Acceptance Test | 56% | 38% | 88% |
| 1 Acceptance Test | 63% | 48% | 90% |
| 2 Acceptance Test | 100% | 80% | 100% |
| Heuristic Acceptance Test | 100% | 100% | 100% |
| Mean Noise Vote | | 221 | |

The success rates for frames 200 to 298 of sequence 1, after application of the 1δ confidence threshold test are not as high as for frames 200 to 235, because of noise in the supplied pose and altitude data between frames 238 and 260. This causes poor quality registration of the images after viewpoint correct and hence erroneous accumulator peak positions. However, the test rejects the erroneous peaks well in the $V_{north}$ and $V_{down}$ axes, though it is less successful in the $V_{east}$ axis. Again, the scene structure orientation is believed to be responsible for the degraded performance in this axis.

The 1δ confidence test for sequence 2 gives good results in $V_{down}$ and marginal results in $V_{north}$. The $V_{east}$ results are not as good as anticipated from use of the 1δ test. For this sequence, a number of peaks did exceed the 2δ confidence threshold, giving good results in all axes, though again the $V_{east}$ result is not as good as the 2δ confidence test predicts.

For both sequences, a heuristic acceptance threshold yielded 100% success rates in all axes, though only small numbers of accumulator peaks passed these tests.

To conclude, the results of the experiments with representative real data are encouraging, showing success rates of up to 100% at a resolution of 2.2×2.2×1.0 meters after the application of a statistically derived acceptance test. Application of a heuristic acceptance test yields success rates of 100% in all axes, at this resolution, though more work is needed to generate a sound theoretical basis for these higher thresholds.

For both test sequences used, the $V_{east}$ performance is markedly worse than for other axes and is worse than expected from the use of the acceptance test. Inspection of the accumulator vote distribution for image pairs from sequence 1 shows a ridge oriented in an east to west direction. Small amounts of noise cause the peak position to move along this ridge and hence the $V_{east}$ performance is poor. A similar feature can be seen in the accumulators for sequence 2 image pairs. The dominant structure in both these image sequences is oriented from east to west, so providing poor constraints on $V_{east}$ and hence explaining the observed accumulator structure.

The current acceptance test does not model the effects of scene structure orientation, so further work is planned to include these effects and hence allow better rejection of erroneous peaks. The results of applying the heuristic acceptance test suggest that a sufficiently high threshold will reject localization errors: the challenge is to derive an analytical approach to setting this threshold.

The algorithm is also highly sensitive to noise in the supplied pose and altitude data and work is in progress to relate the minimum achievable accumulator bin size to the noise in the supplied parameters and in the image sequence.

It will be appreciated that the integration of this method of INS accuracy enhancement into apparatus such as that shown in FIG. 1 leads to an INS with marked accuracy improvement compared with the accuracy of current INS systems.

Various INS systems will be capable of supporting the invention and thus improvements in the art of INS will be realized, resulting in more accurate and less complicated methods of positional accuracy measurement.

What is claimed is:

1. According to the present invention an inertial navigation system positional accuracy enhancement system (INS accuracy enhancement system) comprises imaging sensor means for imaging the terrain over which an aircraft is flown, at least two image storage means for temporarily storing successive images of the said terrain, switching means for connecting the at least two image storage means in a repeating sequence to the imaging sensor means overwriting any previously stored images therein, predicted image generating means adapted for connection to angular and linear velocity outputs of an INS for sequentially accessing and modifying images stored by the at least two image storage means in accordance with data provided by said angular and linear velocity outputs to produce a sequence of predicted images, and, comparator means for comparing each of said predicted images with images stored by the at least two image storage means after the production of said predicted images and for producing a velocity correction signal therefrom for application to a position correction input of said INS.

2. An INS accuracy enhancement system as claimed in claim 1 and wherein said comparator means operates according to a program using a Hough Transform to compare pixel flow estimates made in the image plane with a series of pixel flow predictions generated by combining knowledge of the imaging sensor means position relative to the ground plane with estimates of velocity provided by the INS.

3. An INS accuracy enhancement system as claimed in claim 1 and wherein said imaging sensor means is a video camera and said image storage means are video frame stores.

4. An INS accuracy enhancement system as claimed in claim 2 and wherein said imaging sensor means is a video camera and said image storage means are video frame stores.

5. According to the present invention an inertial navigation system positional accuracy enhancement system (INS accuracy enhancement system) comprises:

a video camera imaging the terrain over which the aircraft is flown;

at least two frame stores, responsive to said video camera, temporarily storing successive images of the said terrain;

a switch connecting said at least two frame stores in a repeating sequence to the video camera overwriting any previously stored images therein;

image prediction processor connected to angular and linear velocity outputs of an INS sequentially accessing and modifying images stored by the at least two frame stores in accordance with data provided by said angular and linear velocity outputs to produce a sequence of predicted images, and, a comparator comparing each of said predicted images with images stored by the at least two frame stores after the production of said predicted images and for producing a velocity correction signal therefrom for application to a position correction input of said INS.

6. An INS accuracy enhancement system as claimed in claim 5 and wherein said comparator operates according to a program using a Hough Transform to compare pixel flow estimates made in the image plane with a series of pixel flow predictions generated by combining knowledge of the video camera position relative to the ground plane with estimates of velocity provided by the INS.

* * * * *